J. A. RYLANDER.
BOLL WEEVIL TRAP.
APPLICATION FILED JULY 29, 1920.

1,409,973.

Patented Mar. 21, 1922.
2 SHEETS—SHEET 1.

J. A. Rylander, INVENTOR.

BY

ATTORNEY

J. A. RYLANDER.
BOLL WEEVIL TRAP.
APPLICATION FILED JULY 29, 1920.

1,409,973.

Patented Mar. 21, 1922.
2 SHEETS—SHEET 2.

J. A. Rylander, INVENTOR.

BY
ATTORNEYS

UNITED STATES PATENT OFFICE.

JOEL A. RYLANDER, OF NIXON, TEXAS.

BOLL-WEEVIL TRAP.

1,409,973.  Specification of Letters Patent.  Patented Mar. 21, 1922.

Application filed July 29, 1920. Serial No. 399,947.

*To all whom it may concern:*

Be it known that I, JOEL A. RYLANDER, a citizen of the United States, residing at Nixon, in the county of Gonzales and State of Texas, have invented certain new and useful Improvements in Boll-Weevil Traps, of which the following is a specification.

The object of this invention is to provide simple and efficient means whereby as a cultivator or similar agricultural implement is driven along a row of cotton plants the plants will be relieved of the weevil infesting the same and the insect destroyed. The invention seeks also to provide a device for the stated purpose which may be readily cleaned and which will not injure the growing plants. The invention is illustrated in the accompanying drawings and will be hereinafter fully described, the novel features being pointed out in the appended claims.

In the drawings—

Figure 1:
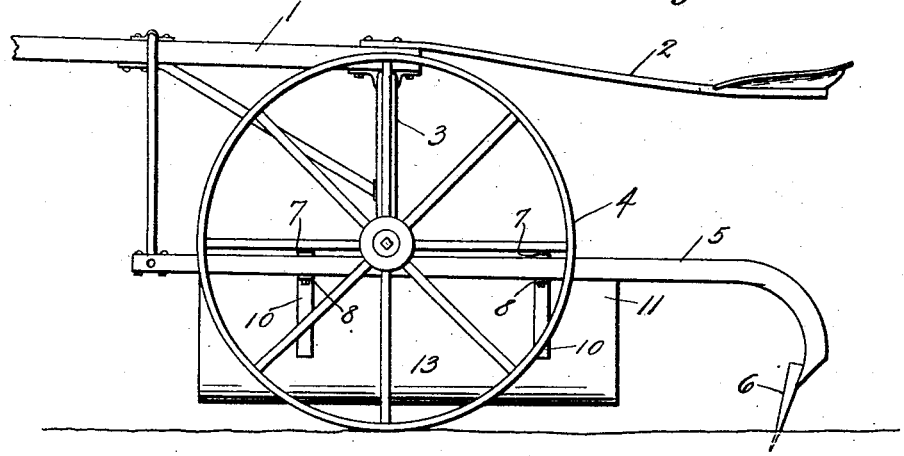
Figure 1 is a side elevation of a cultivator having my improved trap mounted thereon.

The cultivator may be of any preferred type and in the accompanying drawings is shown as comprising a frame 1 upon which a seat 2 is mounted and which is carried by an arched axle 3 having ground wheels 4 upon its ends. Suitably connected with the frame 1 and the arched axle are cultivator beams 5 carrying shovels or cultivator blades 6 which are adapted to run in the ground at the sides of a row of plants and loosen the dirt and turn the top soil over toward the plants in the usual manner.

Figure 2:
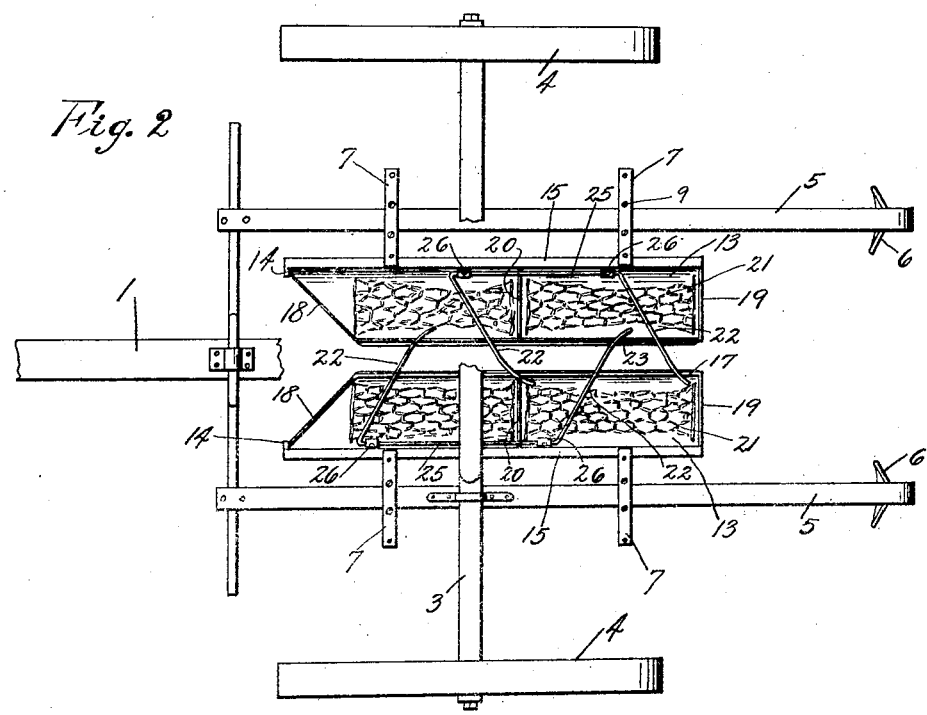
Fig. 2 is a plan view of the same, partly broken away.
Figure 3:
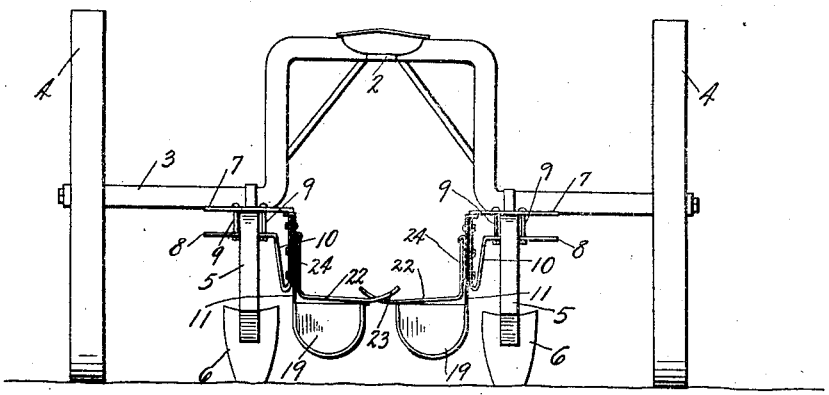
Fig. 3 is a rear elevation thereof.
Figure 4:
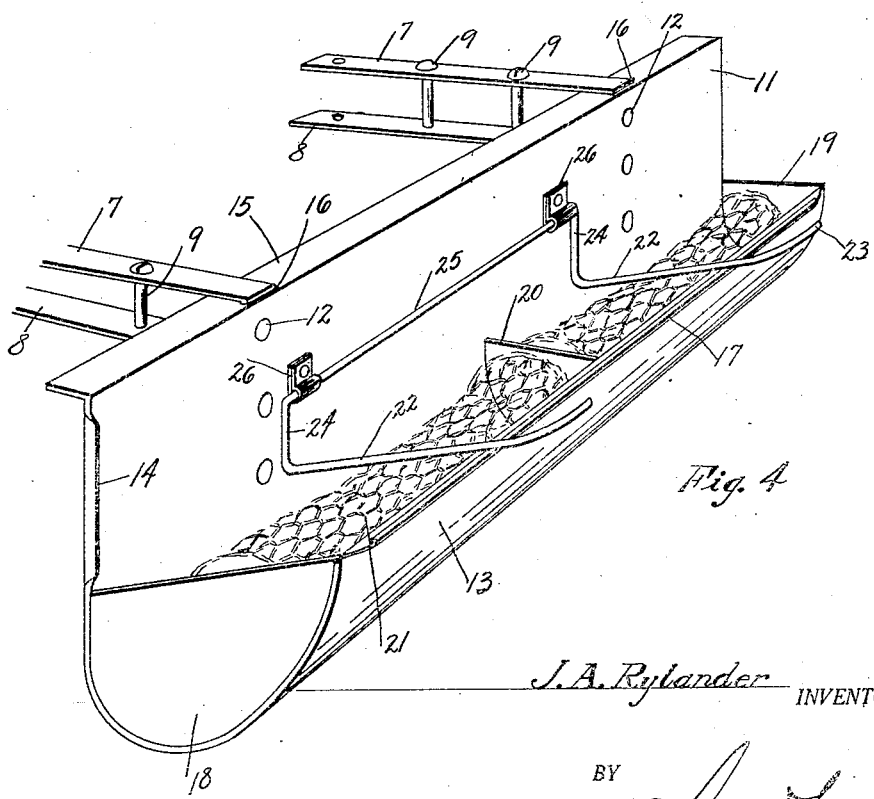
Fig. 4 is an enlarged detail perspective view of a portion of the trap.

In applying my invention to such a cultivator as is shown in the drawings, I employ clamping brackets each consisting of upper and lower jaws 7 and 8 which are adapted to pass across a cultivator beam 5 above and below the same and receive bolts or similar fastenings 9 whereby they may be effectually clamped upon the cultivator beam. These jaws or clamping plates 7 and 8 are connected at their inner ends by a vertically disposed U-shaped portion 10 which is securely fastened to the side plate 11 of the trap by fasteners 12 as will be readily understood. The plate 11 will preferably be sheet metal of rectangular form having its lower portion rolled to form a trough 13, an inwardly projecting lip 14 being provided at the front end of the plate 11, as clearly shown in Fig. 4. The upper longitudinal edge of the plate is turned outwardly to provide a reinforcing flange or rib 15 provided with slots 16 through which the inner branch of the U-shaped attaching portion 10 of the bracket passes. The inner or free edge of the trough 13 is also provided with an inwardly projecting lip or flange 17 which serves to reinforce the edge of the trough and tends to hold the same against bending. Moreover, the lip 14 and the flange 17 also aid in turning aside the plants so that they will not be cut by sharp edges of the plate and their growth thereby checked. End walls 18 and 19 are provided to close the ends of the trough and the front end wall 18 is disposed obliquely relative to the side wall 11, as shown clearly in Fig. 2, so that the lateral branches of the plants will be turned inwardly and not forced backwardly and broken as the machine is drawn along the row. The trough 13 is intended to contain gasoline or some other insecticide and to prevent the liquid flowing to and accumulating at one end of the trough if the cultivator should dip sharply under some steep grade or irregularity in the surface of the field, I provide a transverse partition 20 intermediate the end walls 18 and 19, as clearly shown. A guard 21 which is preferably of coarse mesh netting is placed within the trough to prevent leaves upon the plants dipping into the liquid and splashing or otherwise drawing the same from the trough. The guard may be placed within the trough in any preferred manner and may be conveniently rolled in the form of a cylinder and simply placed lengthwise upon the bottom of the trough so that the wall of the cylinder thus formed will support the upper side thereof approximately in the plane of the inner edge of the trough.

Upon the inner side of the side plate 11, I mount beater fingers 22 which as the cultivator is drawn over the field will ride against the plants and agitate the same sufficiently to cause the weevils to drop therefrom into the trough. As clearly shown in the drawings, the beater fingers are disposed obliquely relative to the trough and inclined rearwardly, the beaters on one trap alternating with the beaters on the cooperating trap, as clearly shown in Fig. 2. It will, of course, be readily understood that two traps are provided upon the cultivator and are so arranged that as the machine is drawn along the row of plants the plants will pass between the two traps while the fingers bridge the space between the traps, as clearly shown in Fig. 2. Inasmuch as the fingers upon the two traps are disposed alternately, it will be readily seen that the plants are caused to bend or sway alternately toward the opposite sides of the row and the agitation of the plants thus effected will shake therefrom all the weevils and imperfectly developed bolls. The fingers are curved slightly rearwardly at their outer ends, as shown at 23, while their inner ends are integral with cranks 24 depending from the ends of a rock shaft 25 which is fitted in suitable bearings 26 upon the side plate 11. The rearwardly deflected outer ends of the fingers permit the fingers to ride over the plants without injuring the same and the cranks 24 by bearing against the side plate 11 effectually prevent the fingers dropping or yielding to the impact of the plants. At the same time, however, the fingers may be swung upwardly so as to project outwardly over the upper edge of the side plate 11 and thus permit access to the trough when it is desired to clean the same as will be readily understood. Inasmuch as the fingers extend entirely across and beyond the trough they very effectually prevent accidental dislodgment of the screens 21.

It is thought the operation and advantages of my improved trap are obvious from the foregoing description, taken in connection with the accompanying drawings. The plants are caused to sway sharply from side to side as the pair of traps are drawn along the row past the plants and the insects are thereby effectually shaken therefrom and fall into the troughs where they may be destroyed by the insecticide or may be permitted to collect to be subsequently destroyed in any preferred manner. The device is very simple in its construction and may be produced and applied to a cultivator at a very low cost. By providing a plurality of openings through the attaching arms 7 and 8, the troughs may be adapted to cultivators of different widths without any change in construction and easily adjusted to properly bear upon the plants.

Having thus described the invention, what is claimed as new is:

1. A device for the purpose set forth comprising a side plate, a trough projecting laterally from the lower portion of the side plate, a rock shaft mounted upon the side plate above the trough, cranks at the ends of said rock shaft adapted to bear against the side plate, and rearwardly inclined beater fingers extending from the ends of said cranks over the trough.

2. A device for the purpose set forth comprising a side plate having an outwardly projecting flange along its upper edge, a trough carried by said plate, beater fingers mounted upon the side plate and extending across the trough, and clamping jaws extending laterally from the side plate and connected at their inner ends by a vertically disposed portion secured to and against the outer side of the side plate and passing through the flange at the upper edge of the same.

In testimony whereof I affix my signature.

JOEL A. RYLANDER. [L. S.]